United States Patent Office 3,257,730
Patented June 28, 1966

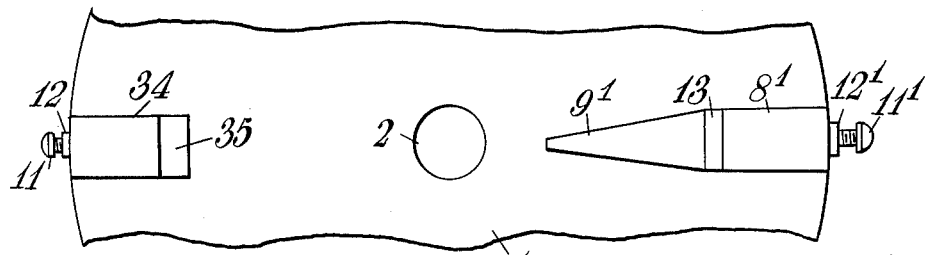
Fig.4.
Fig.5.
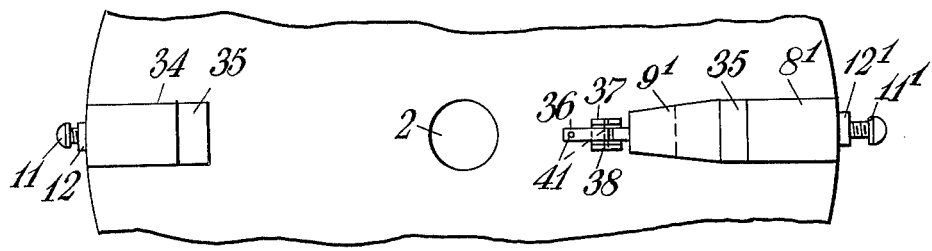
Fig.6.
Fig.7.

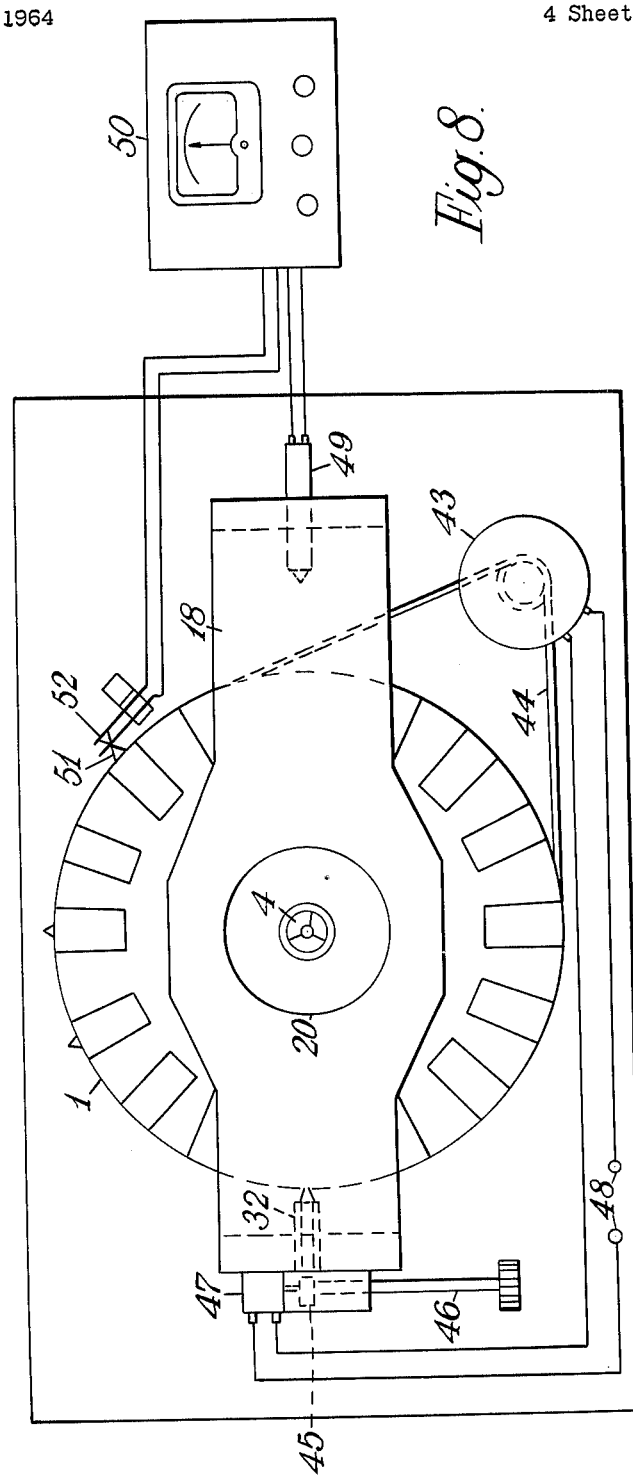

3,257,730
MEASURING DEVICES
Donald Alfred Welfare, Croydon, Surrey, and Frederick William Gentry, Beddington, Croydon, Surrey, England, assignors to Muirhead & Co. Limited
Filed Jan. 17, 1964, Ser. No. 338,400
Claims priority, application Great Britain, Dec. 20, 1963, 50,461/63
4 Claims. (Cl. 33—174)

This invention relates to measuring devices and methods of testing.

The invention consists in an apparatus for testing a series of dimensions of an article comprising probes associated with each of the dimensions to be tested, means for bringing them into contact therewith and means by which the respective probes while thus in contact may be successively associated with a common measuring means.

Thus the probes may be mounted in circumferentially spaced positions in a ring around the article and by rotation brought successively into contact with a measuring device. Alternatively the probes may be in linearly spaced positions and successively presented to the common measuring means by a linear movement.

The measurements are made with reference to readings obtained with an article of known measurements used to set up the apparatus.

The invention will be further described with reference to embodiments shown in the accompanying drawings.

Figure 1:
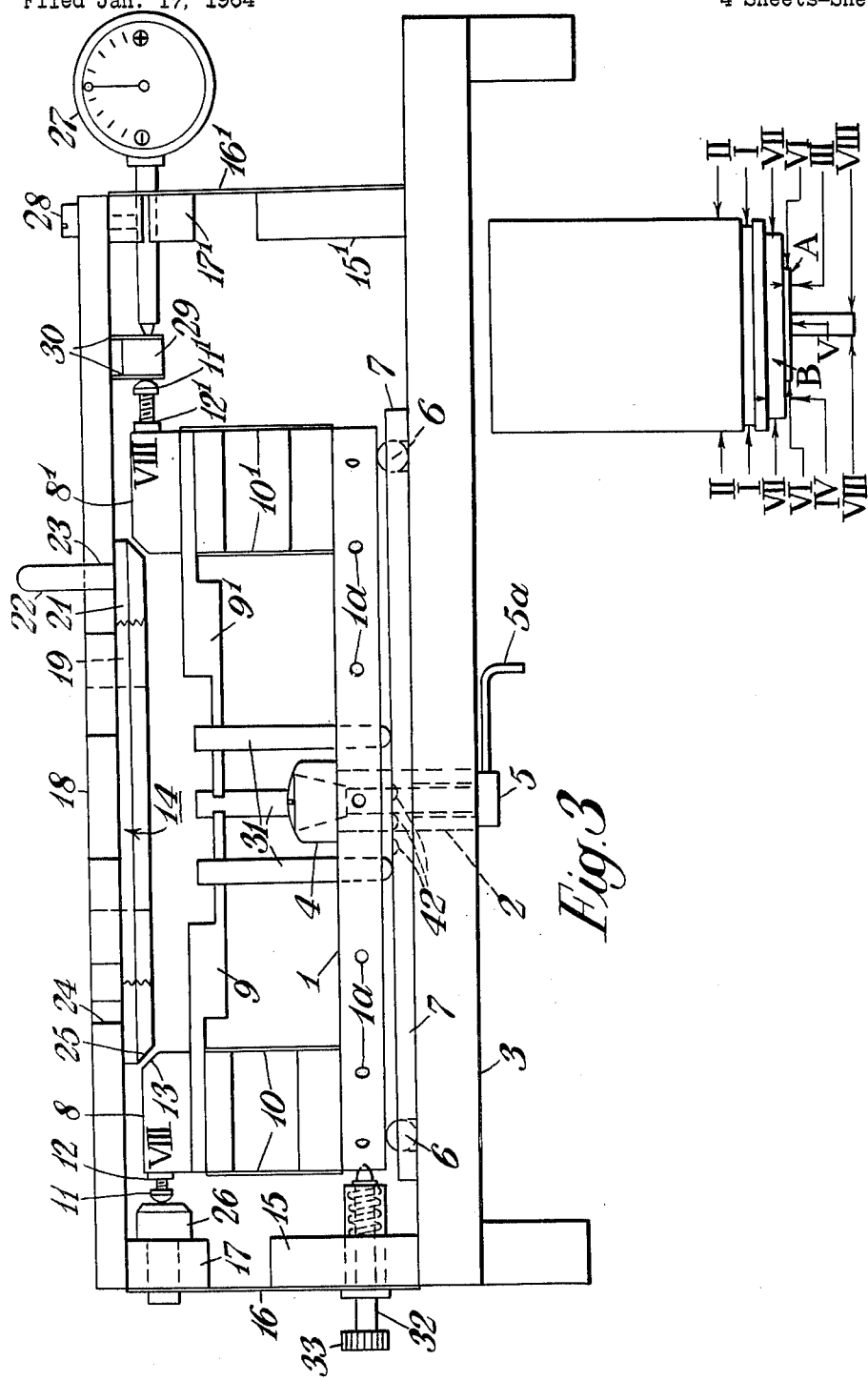
Figure 2:
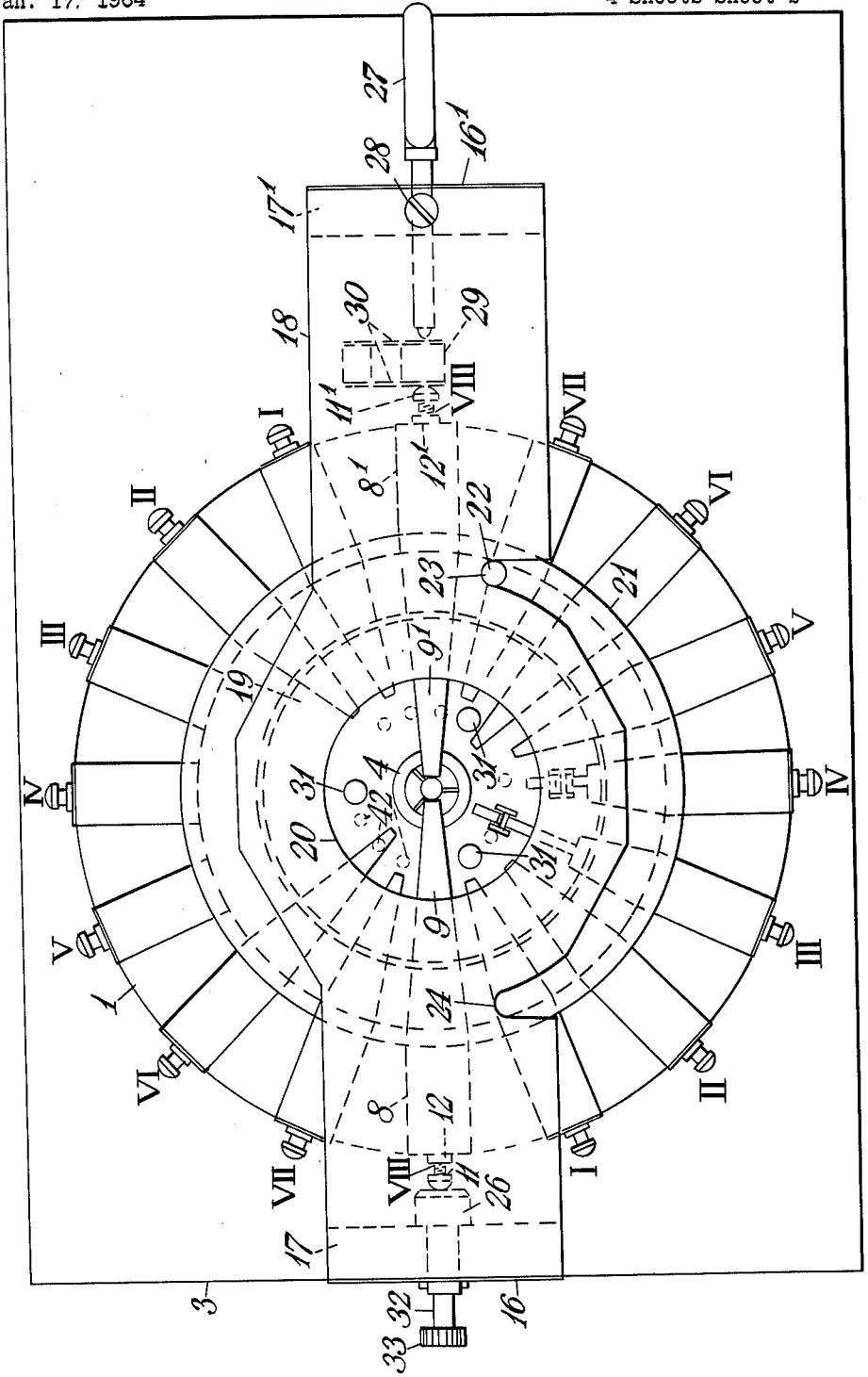

FIGURE 1 is a side elevation of an article the measurements of which are to be tested in this case a synchro;
FIGURE 2 is a plan of an embodiment; and
FIGURE 3 is a side elevation with certain parts omitted.
FIGURE 4 is a detail of FIGURE 2; and
FIGURE 5 is a side elevation of this detail.
FIGURE 6 is a further detail of FIGURE 2; and
FIGURE 7 is a side elevation of this further detail;
FIGURE 8 is a plan view showing modifications of the embodiment of the previous figures.

The embodiment of the invention to be described is specifically adapted to the gauging of the critical dimensions of a range of synchros and there are provided measuring stations for making the following measurements (see FIGURE 1):

I. Groove diameter
II. Body diameter
III. Length spigot (A)
IV. Length spigot (B)
V. Spigot (A) concentricity
VI. Spigot (A) diameter
VII. Spigot (B) diameter
VIII. Shaft diameter Referring to FIGURES 2 and 3, circular disk 1 is adapted for rotation about pivot 2 rigidly attached to base plate 3. Pivot 2 is bored to take collet chuck 4 which is operated by draw nut 5. Disk 1 rotates freely on a ring of steel balls 6 running in ballrace 7. Mounted on the upper face of disk 1 are measuring stations for the dimensions I to VIII (FIGURE 1).

For the measurement of diametrical dimensions I, II, VI, VII and VIII, a measuring station, one of which that for dimension VIII is shown in FIGURE 3 and comprises two blocks, 8 and 8', diametrically opposed. The blocks are split in a horizontal plane and test probes 9 and 9' are clamped therebetween facing inwardly at the correct height for the measurement VIII. Blocks 8 and 8' are attached to disk 1 by means of pairs of vertical parallel flat steel springs 10 and 10' so as to permit a limited radial movement of the test probes in relation to the pivot axis and are provided on their outer faces with round headed pins 11 and 11', screwed therein for the purpose of adjustment and retained in position by locking nuts 12 and 12'. The upper inside edges of blocks 8 and 8' are chamfered as at 13 for a purpose to be described later. A bridging structure, generally indicated at 14 in FIGURE 3, comprises mounting blocks 15 and 15' rigidly attached to base plate 3. Attached to mounting blocks 15 and 15' are vertically disposed flat steel springs 16 and 16', to the upper ends of which are attached mounting blocks 17 and 17' supporting bridging piece 18 to permit of diametrical movement in relation to the pivot axis. Screw 19 is attached to the under surface of bridging piece 18 and is concentric with the axis of disk 1. A hole 20 (FIGURES 2 and 8) bored concentrically through screw 19 and bridging piece 18 permits entry of the synchro (FIGURE 1) to be measured. Nut 21 runs on screw 19 and may be rotated by handle 22 over an arc determined by recessed stops 23 and 24 as shown in FIGURE 2. Thus, when handle 22 is moved from stop 23 to stop 24, nut 21 is projected downwardly and the chamfered edge 25 thereof engages the chamfered edges of all resiliently mounted blocks 10–10' associated with radial measurements thereby forcing them radially outwards. A multistart thread is used here to give rapid advancement of nut 21. Mounting block 17 carries anvil 26, mounted in line with pins 11 in the measuring position and mounting block 17' supports dial gauge 27 also in line with pin 11 in the measuring position, the position of which gauge is adjustable horizontally and may be clamped in position by means of screw 28. A second anvil 29 is interposed between the tip of the probe, associated with dial gauge 27, and the studs 11', and is resiliently attached to bridging piece 18 by flat steel springs 30 which permit of radial movement in relation to the pivot axis. Three pillars 31, symmetrically disposed about the centre line are supported in a vertical position by clearance holes in disk 1 and rotate with it. The lower ends of pillar 31 are rounded and rest on ballrace 7 on base plate 3. The upper ends of pillars 31 are ground flat in a plane which is a known height above the plane of the base plate 3. Spring loaded plunger 32, operable by knob 33, is supported in mounting block 15. The tip of plunger 32 is shaped to engage indentations 1a in the rim of disk 1 at points corresponding to the measuring stations. Thus, for a particular engagement, the corresponding studs 11 and 11' are in engagement with anvils 26 and 29, as shown in FIGURE 3. A further indentation isplaced midway between station VIII and station I. This is referred to as the "loading station."

FIGURES 4 and 5 show the arrangement of a measuring station for the determination of concentricity, i.e. measurement V in which only one resiliently mounted test probe 9' is required. In this instance, the opposite assembly 34 carrying pin 11 is solid and is cut away at 35 so as not to impede the downward movement of nut 21.

FIGURES 6 and 7 show a measuring station for the measurement of length. Here again, block 8' carrying measuring probe 9' is resiliently mounted on springs 10' while the opposite assembly 34 is solidly mounted. In this instance, the tops of both assemblies are cut away, as at 35, to clear nut 21. Since the measurement of length is vertical whereas the actual detection of error requires a horizontal movement, a bell crank 36, pivoted at 37 in pillar 38, is interposed between the surface 39, at which the measurement is made and the inner face 40 of test probe 9'. Small steel balls 41 recessed into bell crank 36 provide point contact between the bell crank and the surfaces 39 and 40.

The setting-up procedure may be carried out in the following stages:

(1) Set the disk 1 to the loading station.
(2) Rotate nut 21, by means of handle 22, to retract all measuring probes associated with radial measurements.

(3) Open collet chuck by means of handle 5a, on drawnut 5.

(4) Insert test gauge (FIGURE 1) with the part simulating the synchro spindle facing downwards through hole 20 in bridging piece 18, until this part enters the collet chuck 4 and further downward movement is arrested by pillars 31.

(5) Close collet chuck.

(6) Release measuring probes.

(7) Set disk 1 to station for measuring dimension I, i.e. so that the pins 11, 11' lie between the anvils 26, 29. This is done by pulling out knob 33, turning disk 1 into the correct position and releasing knob 33 to engage in the appropriate indentation 1a.

(8) Adjust pin 11 to make contact with anvil 26 and pin 11' to make contact with anvil 29, ensuring that pin 11' biases anvil 29 outwardly by a small amount (this may involve retraction from between the anvils 26, 29 to make the necessary adjustments).

(9) Adjust the dial gauge 27 to make contact with the opposing face of anvil 29 so that the gauge reads zero or the known error.

This setting-up procedure is repeated for each of the measuring stations. Thus, when the test gauge is replaced by a synchro the dial gauge will register the dimensional error at each of the measuring stations.

When gauging the spigot diameters at stations VI and VII, and spigot concentricity at station V, it is necessary to rotate the body of the synchro through 360 degrees. For this purpose, there are provided, relative to these stations, small indentations in the ballrace 7 on base plate 3, as shown at 42 in FIGURE 3, to allow pillars 31 to fall by gravity downwardly when the pillars register with the indentations 42. This disengages pillars 31 from the synchro and allows said synchro to rotate freely.

It will be understood that the blocks 8, 8' are pre-cut so that the probes mounted therein are of the correct heights for the particular dimensions to be tested.

It will be seen that in the positions for making the measurements I, II, VI, VII and VIII, the corresponding probes 9, 9' are of the correct length to engage the synchro (FIGURE 1) at the desired positions under radial pressure from the pairs of springs 10, 10' respectively.

The anvil 29 being biased radially outwardly ensures that the anvils 26 and 29 are in contact with the pins 11, 11', while the springs 16, 16' supporting the bridge 18 provide a tolerance for any eccentricity in the rotation of the disk 1.

For a completely accurate synchro and with the pins 11, 11' set to the same diameter the gauge 27 could be set to read zero for each of the measurements mentioned.

The collet chuck may now be opened by means of handle 5a or drawnut 5. The nut 21 is then rotated by means of handle 22 to retract the measuring probes associated with radial movement.

The operations may then be repeated with a synchro to be inspected.

FIGURE 8 shows some modifications designed to increase the accuracy of measurement and to simplify and speed up the operation of the device. To increase the speed and simplify the measuring procedure, the disk 1 is rotated by power means, such as an electric motor in cooperation with the spring loaded plunger 32. In the figure, disk 1 is rotated by electric motor 43 through the medium of spring belt 44. The spring loaded plunger 32, associated with the detent mechanism is operated by cam 45 over shaft 46. Linked with cam 45 is switch 47. It is arranged that when the detent is engaged, the switch is in the "off" position. When, by the operation of cam 45, the detent is released, the switch closes and the motor 45 is energized from a convenient source 48. Disk 1 will now rotate until the detent engages at the next station whereupon the motor is disconnected from the supply and stops. To increase the accuracy of measurement, an electronic gauge employing a test probe 49 which may be of the piezo-electric or magneto-electric kind is used in place of a single dial gauge with means for changing the measuring range at various stations where required. The electrical output of probe 49 is fed to electronic gauge 50. To change the sensitivity of the gauge, there is provided a pin 51 on the periphery of disk 1, so positioned that at the particular station at which it is required to change the sensitivity, contacts 52 are operated. For multi-range purposes, there may be a bank of contact assemblies 52 operated by pins strategically placed round the periphery of disk 1, e.g. at various heights, and connected to the electronic gauge 50.

With this arrangement it is not essential to set each pair of pins exactly to a standard separation since the actual zero or standard dimension to which the dimension being measured is referenced may be set up on the particular channel of the measuring instrument in a known manner. One way of accomplishing this is by biasing the electronic gauge 50 so that it reads zero when the input indicates a known error. Thus, the error is not included in the measurement:

Many variations will occur to those skilled in the art. For example, the output of probe 49 may be applied to operate a recording device. A warning, either in the form of a light or an aural device may be made to operate when certain limits are exceeded. Also for each testing position a visual display may be given indicating the measurement being made and its tolerances.

Although the embodiment described relates to the testing of synchros, the principle of measurement and the particular means of making the measurement may be applied in many ways without departing from the scope of the invention.

We claim:

1. An apparatus for testing the dimensions of a rotatable electrical device such as a synchro comprising means for clamping the synchro shaft, a mounting rotatable around the clamping means, pairs of diametrically opposed, radially divided probes secured to the mounting in spaced circumferential positions around the rotational axis of the synchro in the clamped position, each pair being mounted at a different position above the rotation of axis according to the position of the dimension to be measured and being of length sufficient to reach the dimension to be measured, spring means forcing the inner ends of the probes against the synchro at positions corresponding to the dimensions to be measured on the synchro when in position, adjustable pins on the outer ends of the probes and a gauging means between which the pins of each pair of diametrally disposed probes may be located in succession by rotation of the rotational mounting.

2. An apparatus as claimed in claim 1, in which the gauging means comprise a bridge member spring mounted for movement either way in the direction of its length, a fixed anvil on the bridge member for engaging one of the pins of each pair of probes and a spring mounted anvil for bearing against the other pin of each pair of probes and means for detecting movement of the spring mounted anvil in the direction between the two pins due to deviation of the dimension of the synchro being measured from a standard value.

3. An apparatus as claimed in claim 2, in which means are provided on the bridge member for retracting the probes away from the rotational axis for the purpose of changing the synchro to be tested.

4. An apparatus as claimed in claim 2, comprising additionally in a spaced circumferential position a single radially directed probe mounted on the rotatable mounting, spring means for urging its inner end into contact with a synchro at a position to be measured for concentricity by rotation of the synchro about its shaft, adjustable pin means at the outer end of the probe, a fixed member mounted on the rotatable mounting in a position diametrically opposed to the single probe and adjustable pin means on the radially outer side of the fixed member to form a radially fixed reference for engaging the bridge means while the synchro is being rotated to vary the position of the pin of the single probe in accordance with variations in concentricity of the dimension being tested.

References Cited by the Examiner

UNITED STATES PATENTS

| | | | |
|---|---|---|---|
| 1,364,534 | 1/1921 | Walter | 33—175 |
| 2,370,220 | 2/1945 | Aller | 33—174 |
| 2,547,719 | 4/1951 | Rosser | 33—174 |
| 2,806,294 | 9/1957 | Cargill | 33—174 |
| 2,944,342 | 7/1960 | Bartlett | 33—174 |
| 3,110,112 | 11/1963 | Dalgleish | 33—174 |

FOREIGN PATENTS 712,539   7/1954   Great Britain.

ISAAC LISANN, *Primary Examiner.*

LEONARD FORMAN, *Assistant Examiner.*